June 30, 1925.

W. H. PHILLIPS ET AL

FLEXIBLE COUPLING

Filed Feb. 20, 1920

1,543,720

2 Sheets-Sheet 1

WITNESSES:
Fred C. Williams
N. M. Biebel

INVENTOR
William H. Phillips &
William G. Hussey
BY
Wesley G. Carr
ATTORNEY

June 30, 1925.
W. H. PHILLIPS ET AL
1,543,720
FLEXIBLE COUPLING
Filed Feb. 20, 1920
2 Sheets-Sheet 2
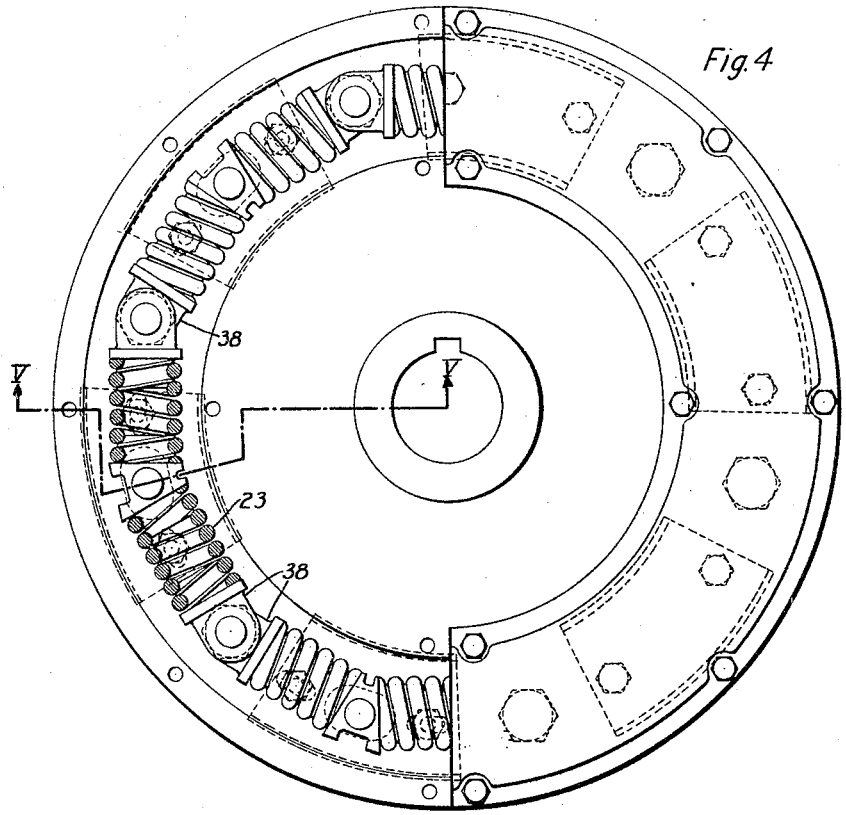
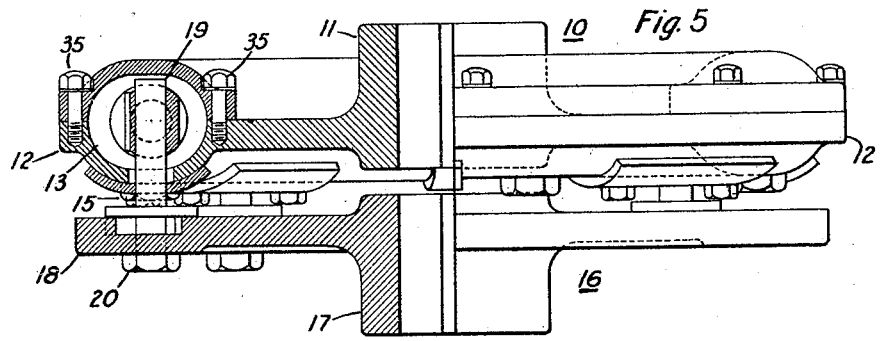
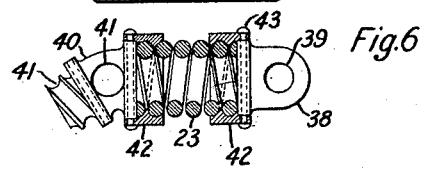
WITNESSES:
INVENTOR
William H. Phillips &
William G. Hussey
BY
ATTORNEY Patented June 30, 1925.

1,543,720

UNITED STATES PATENT OFFICE.

WILLIAM H. PHILLIPS, OF ASPINWALL, AND WILLIAM G. HUSSEY, OF PITTSBURGH, PENNSYLVANIA, ASSIGNORS TO R. D. NUTTALL COMPANY, A CORPORATION OF PENNSYLVANIA.

FLEXIBLE COUPLING.

Application filed February 20, 1920. Serial No. 360,040.

To all whom it may concern:

Be it known that we, WILLIAM H. PHILLIPS, a citizen of the United States, and a resident of Aspinwall, in the county of Allegheny and State of Pennsylvania, and WILLIAM G. HUSSEY, a citizen of the United States, and a resident of Pittsburgh, in the county of Allegheny and State of Pennsylvania, have invented a new and useful Improvement in Flexible Couplings, of which the following is a specification.

Our invention relates to driving connections and particularly to flexible couplings for shaft drives.

One object of our invention is to provide a flexible coupling which may be machined all over and which may therefore be perfectly balanced.

Another object of our invention is to provide a flexible coupling which will not transmit end thrust or longitudinal movement of one shaft to the other shaft.

Another object of our invention is to provide a flexible coupling using helical springs, so arranged that no complicated spring stresses are set up in case of shaft mis-alinement or of relative longitudinal movement and so that a broken spring may be easily and quickly replaced.

In practicing our invention, we provide two flanged hub members each provided with longitudinally extending pins secured to the flange. The pins on the driving member project through openings in the flange of the driven member. We provide also resilient members operatively connecting the pins on the driven and on the driving flanged hubs, each resilient member comprising a helical spring having two end members or plugs one of which is pivotally mounted on one pin of the driving member and the other of which is slidably mounted on a pin of the driving member. An annular cover member co-operates with an annular groove in the flange of the driven member to provide a cover for the springs and the end members comprising the resilient connecting links.

Figure 1:
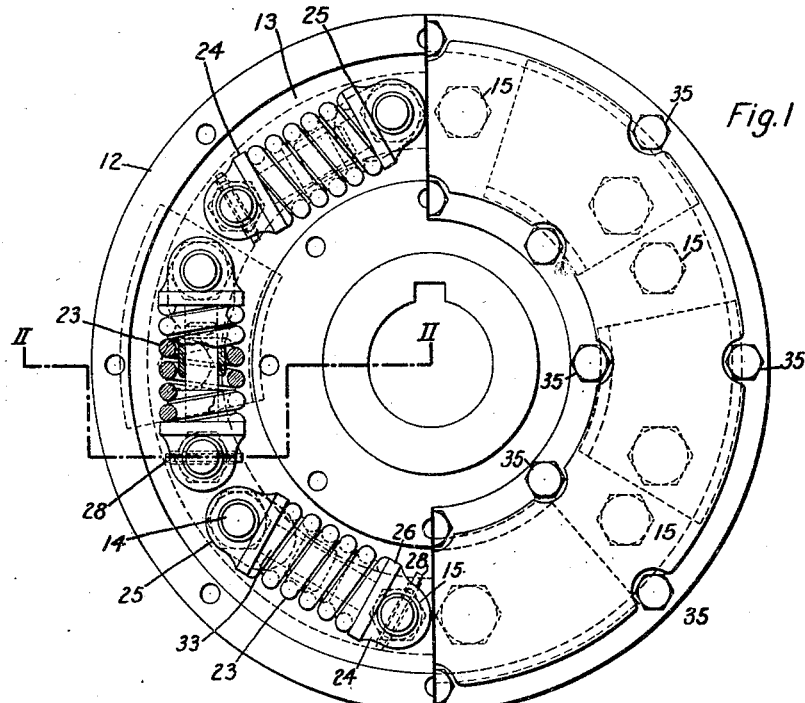
Figure 2:
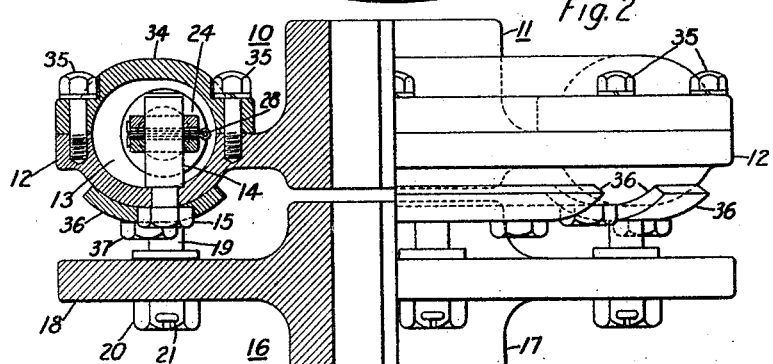
Figure 3:
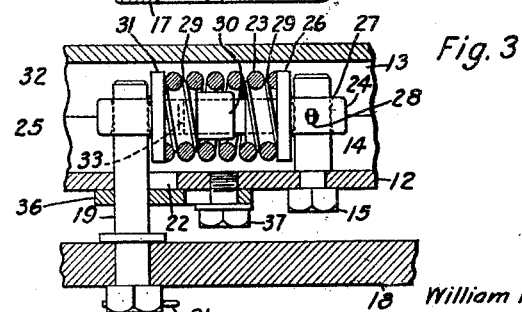

In the two sheets of drawings, Figure 1 is an end view of a driving connection embodying our invention, one half of the cover member being removed; Fig. 2 is a side view, partly in section, along the line II—II of Fig. 1; Fig. 3 is a view, partly in section, of one of the resilient connecting members; Fig. 4 is an end view of a modification of the device embodying our invention, as arranged for reversible operation; Fig. 5 is a side view thereof, partly in section, along the line V—V of Fig. 4, and Fig. 6 is a view, partly in section, of one of the resilient connecting members.

Referring to Figs. 1, 2 and 3, which comprise a non-reversible coupling, a driven member 10 comprises a hub member 11 and a flange portion 12, the flange portion 12 being provided with an annular groove 13 in its outer face. A plurality of pins 14 are provided, extending, parallel to the axis of rotation, into the annular groove 13 and are secured to the flange 12 by means of nuts 15. A driving member 16 comprises a hub portion 17 and a flange portion 18 and is provided with a plurality of pins 19 secured thereto, by any approved means, here shown as nuts 20 and cotter pins 21. The pins 19 extend parallel to the axis of rotation in the same direction as the pins 14 and through openings 22 in the flange 12 into the annular groove 13. The hub portions 11 and 17 are arranged for mounting on separate shafts (not shown) in any approved manner. The pins 14 and 19 are located equidistant from the axis of rotation in order to secure perfect balance, not only of the assembled device as a whole but also of the individual parts of the device.

The respective pins 14 and 19 are operatively connected by means of a resilient link comprising a spring member 23 and two flanged end members or spring plugs 24 and 25. The end member 24 is provided with a flange 26 which engages an end turn of the spring 23 and is so provided with substantially circular opening 27 at its outer end that it may be mounted on one of the pins 14 near its outer end. The opening 27 is so chamfered that there shall be practically a line contact between the pin 14 and the end member 24, and a cotter pin 28 is provided to retain the end member 24 on the pin 14. This construction permits the end member 24 to have a pivotal movement on the pin 14 in a plane parallel to the axis of rotation. A helical groove 29 is provided just inside of the flange 26 to engage one or more turns of the helical spring 23, and the inside end of member 24 is formed as a cylindrical pin 30. The end member 25 is provided with a flange 31 similar to the flange 26 on the end member 24, and its outer end is provided with a substantially circular opening 32 so that it may operatively engage the pin 19. A helical groove 29 is provided on the end member 24 to engage one or more turns of the other end of the spring 23, and the inner end has a circular opening 33 which is adapted to fit over the end 30 of the end member 24. The opening 32 is so chamfered that the end member 25 may slide easily on the pin 19 in case of relative longitudinal movement of the two halves of the coupling. A co-operating annular grooved member 34 is provided and suitably secured to the flange portion 12 by means of bolts 35 to serve as a cover for the resilient links. The openings 22 are covered by curved plates 36 which are slidably secured to the flange portion 12 by means of bolts 37 and permit the tangential distance between the members 14 and 19 to vary slightly during the operation of the device, a condition which may result from the compression of the springs 23 as the load transmitted by the coupling increases. The annular groove 13 may be filled with lubricant to permit the easy and quiet operation of the resilient connecting links.

Figs. 4, 5 and 6 show a modification of the device embodying our invention, as arranged for reversible driving connection. The driven member 10 is essentially the same as shown and described for the non-reversible coupling, as is also the driving member 16, and hence, a description will be given here only of the new parts of the device. The pins 19 on the flange portion 18 are arranged intermediate the pins 14 of the flange portion 12. The springs 23 are provided, at one end, with a plug 38, the inner end of which is provided with a helical thread to receive one or more turns of the spring 23. The outer end of the plug 38 is so provided with a chamfered circular opening 39 that it may be pivotally mounted on the pin 19, and suitably secured thereto as by cotter pins (not shown). A double-end plug 40 is provided for the other end of the springs 23, the central part of the plug 40 being provided with a chamfered circular opening 41 so that it may slidably engage the pin 14. Each end of the plug 40 is provided with a helical groove to receive one or more turns of the helical springs 23. As shown in Fig. 6, the spring 23 is secured to the plugs 38 and 40 by means of clamps 42 which are riveted to the plugs by means of one or more rivets 43.

It may be noted that the turning moment is transmitted by compression stresses only in the helical springs in the non-reversible driving connection, while, in the reversible connection, the turning moment is transmitted by both compression and tension stresses in the springs. Since the plugs 25 and 40 may slide on the pins 19, any longitudinal motion of the driving member 16 relative to the driven member 12 will not be transmitted thereto and the helical springs will be stressed laterally. This will preclude the helical springs being subjected to complicated spring stresses which may cause them to break. In case of mis-alinement of the shafts the plugs 25 and 40 will have a sliding movement on their cooperating pins 14 during each revolution, thus precluding any complicated spring stresses, the same as described for relative longitudinal movement of the shafts.

All parts of the device may be readily machined and a good running balance may thus be obtained. In case of spring failure, the coupling will drive solid until the apparatus can be shut down and a new spring inserted in place of the damaged or defective one after removing the cover plate 34. In case of extreme overload, the cooperating end members or blocks 24 and 25 may go solid by means of the plug-and-socket members 30 and 33, before the spring 23 is compressed sufficiently to damage it, and these members will also serve to hold the plugs in axial alinement, insuring an even distribution of the compression load over the spring.

While we have shown a specific design of the device embodying our invention, it is obvious that changes may be made therein without departing from the spirit and scope of our invention, and we desire that only such limitations shall be placed thereon as are imposed by the prior art or are specifically set forth in the appended claims.

We claim as our invention:

1. In a driving connection, the combination with a flanged driven member having a plurality of openings in the flange, a plurality of longitudinally extending pins secured to said flange, and a flanged driving member having a plurality of pins secured to said flange and extending longitudinally through said openings in said driven flange, of means connecting said pins on the driving and driven members, said connecting means being pivotally mounted on the driven flange pins and slidably mounted on the driving flange pins.

2. In a flexible coupling, the combination with a flanged driven member having a plurality of longitudinal openings in the flange, a plurality of longitudinally extending pins secured to said flange, a flanged driving member and a plurality of pins secured to said flange and extending longitudinally through said openings in said driven flange, of flexible means connecting said pins on the driving and driven members, said connecting means being pivotally mounted on the driven flange pins and slidably mounted on the driving flange pins.

3. In a driving connection, the combination with a flanged driven member having a plurality of longitudinal openings in the flange, a plurality of longitudinally extending pins secured to said flange, a flanged driving member, a plurality of pins secured to the flange of said driving member and extending longitudinally through the openings in said driven flange, of tangentially extending flanged members pivotally mounted on the pins secured to said driven member, tangentially disposed flanged members slidably mounted on the pins secured to said driving flange, and tangentially disposed helical springs operatively connecting said pivotally and said slidably mounted flanged members.

4. In a driving connection, the combination with a flanged driven member having a longitudinal opening in said flange, a longitudinally extending pin secured to said flange, a flanged driving member, a pin secured to the flange of said driving member and extending longitudinally through the opening in said driven flange, of tangentially extending flexible means pivotally mounted on the pin secured to said driven flange and slidable mounted on the pin secured to said driving flange.

5. In a driving connection, the combination with a flanged driven member, said flange having an annular groove on one face and a longitudinally disposed opening therethrough, a pin located in said annular groove and secured to said flange and extending parallel to the axis of rotation, a flanged driving member, a pin secured to the flange of said driving member and extending parallel to the axis of rotation and through the opening in said driven flange, of a tangentially disposed helical spring operatively connecting the pins on said driven and said driving members, said spring having one end member pivotally mounted on the pin secured to the flanged driven member and one end member slidably mounted on the pin secured to the flanged driving member, and an annular grooved cover member secured to said driven flange.

6. In a flexible coupling, the combination with a driving member and a driven member of a pin secured to said driving member and a pin secured to the driven member, both of said pins extending axially in the same direction, and tangentially disposed flexible means connecting said pins, one of the pins having a slidable mounting to permit relative longitudinal movement of the pins.

7. In a flexible coupling, the combination with a driving member and a driven member, of a pin secured to said driving member, a pin secured to said driven member, both of said pins extending axially in the same direction, and a tangentially disposed spring connecting said pins and having one end thereof slidably supported to permit freedom of axial movement as between the said members.

8. In a flexible coupling, the combination with a driving member and a driven member, of a pin secured to said driving member, a pin secured to said driven member, both of said pins extending axially in the same direction, and tangentially disposed flexible means connecting said pins, said means comprising a helical spring, a plug operatively connected to one of said pins, and a second plug operatively connected to the other of said pins, one of the said plugs being slidable upon its associated pin.

9. In a flexible coupling, the combination with a driving member and a driven member, of a pin secured to said driving member, a pin secured to said driven member, both of said pins extending longitudinally in the same direction, and a tangentially disposed spring pivotally mounted on one of said pins and slidably mounted on the other of said pins.

10. In a flexible coupling, the combination with a driving and a driven member, normally rotatable about a common axis, of a pin secured to the driving member, a pin secured to the driven member, both of the pins extending axially in the same direction and being equi-distant from the said axis, and flexible means connecting the said pins the said means being slidably supported to permit movement thereof.

11. In a flexible coupling, the combination with a driving and a driven member, normally rotatable about a common axis, of a pin secured to the driving member, a pin secured to the driven member, both of the pins extending axially in the same direction and being equi-distant from the said axis, and yielding means interposed between the said pins and supported for movement longitudinally of one of the pins.

In testimony whereof we have hereunto subscribed our names this 3rd day of February, 1920.

WILLIAM H. PHILLIPS.
WILLIAM G. HUSSEY.

Witness:
GEORGE VETTER.

Certificate of Correction.

It is hereby certified that in Letters Patent No. 1,543,720, granted June 30, 1925, upon the application of William H. Phillips, of Aspinwall, and William G. Hussey, of Pittsburgh, Pennsylvania, for an improvement in "Flexible Couplings," an error appears in the printed specification requiring correction as follows: Page 3, line 100, claim 10, after the word "thereof" and before the period insert the words *axially with respect to one of the said members;* and that the said Letters Patent should be read with this correction therein that the same may conform to the record of the case in the Patent Office.

Signed and sealed this 18th day of August, A. D. 1925.

[SEAL.]
KARL FENNING,
*Acting Commissioner of Patents.*